(12) United States Patent
Hou et al.

(10) Patent No.: US 10,412,680 B1
(45) Date of Patent: Sep. 10, 2019

(54) METHOD AND APPARATUS FOR CONTROLLING POWER DISSIPATION IN A WIRELESS RECEIVER

(71) Applicant: Atmosic Technologies Inc., Campbell, CA (US)

(72) Inventors: Jason Chih-way Hou, San Jose, CA (US); David Su, Saratoga, CA (US); Manolis Terrovitis, Athens (GR); Masoud Zargari, Irvine, CA (US); Teresa Huai-Ying Meng, San Francisco, CA (US)

(73) Assignee: Atmosic Technologies Inc., Campbell, CA (US)

( * ) Notice: Subject to any disclaimer, the term of this patent is extended or adjusted under 35 U.S.C. 154(b) by 0 days.

(21) Appl. No.: 15/916,728

(22) Filed: Mar. 9, 2018

(51) Int. Cl.
*H04W 52/02* (2009.01)
*H04W 52/24* (2009.01)

(52) U.S. Cl.
CPC ..... *H04W 52/0261* (2013.01); *H04W 52/241* (2013.01); *H04W 52/243* (2013.01)

(58) Field of Classification Search
CPC ........... H04W 52/0261; H04W 52/241; H04W 52/243
See application file for complete search history.

(56) References Cited

U.S. PATENT DOCUMENTS

| | | | |
|---|---|---|---|
| 6,323,775 B1 | 11/2001 | Hansson | |
| 8,521,194 B2 | 8/2013 | Laroia et al. | |
| 9,886,658 B1* | 2/2018 | Stanford | G06K 19/0723 |
| 9,949,235 B2 | 4/2018 | Su et al. | |
| 10,038,332 B1 | 7/2018 | Leabman et al. | |
| 2007/0004464 A1 | 1/2007 | Lair et al. | |
| 2009/0017843 A1 | 1/2009 | Laroia et al. | |
| 2015/0380974 A1 | 12/2015 | Lin et al. | |
| 2016/0118805 A1 | 4/2016 | Swope et al. | |
| 2016/0134150 A1 | 5/2016 | Chen et al. | |
| 2016/0285416 A1* | 9/2016 | Tiwari | H02S 50/15 |
| 2017/0019851 A1* | 1/2017 | MacKenzie | H04W 52/0251 |
| 2017/0117754 A1 | 4/2017 | Noori et al. | |
| 2018/0233956 A1 | 8/2018 | Moussaoui et al. | |
| 2018/0316225 A1 | 11/2018 | Yeo et al. | |
| 2018/0335524 A1* | 11/2018 | Youssef | G01S 19/10 |
| 2019/0074717 A1 | 3/2019 | Tsukamoto | |

OTHER PUBLICATIONS

U.S. Appl. No. 15/836,504, filed Dec. 8, 2017 (34 pgs.).

* cited by examiner

*Primary Examiner* — Duc C Ho

(74) *Attorney, Agent, or Firm* — Paradice and Li LLP

(57) ABSTRACT

Method and apparatus for controlling the power consumption of a wireless device are provided. A wireless device may include a configurable radio frequency (RF) front-end that may be configured to use fewer hardware stages and/or processing steps to reduce power consumption based at least in part on a signal quality, detected interference, or system information associated with a received RF signal. In some implementations, the configurable RF front-end may be configured to consume less power while receiving strong RF signals and configured to consume more power while receiving weak RF signals.

26 Claims, 11 Drawing Sheets

METHOD AND APPARATUS FOR CONTROLLING POWER DISSIPATION IN A WIRELESS RECEIVER

TECHNICAL FIELD

The present disclosure relates generally to wireless devices, and specifically to methods and apparatus for controlling power dissipation in a wireless receiver.

BACKGROUND OF RELATED ART

Portable devices (such as wireless communication devices, wireless sensors, and Internet of Things (IoT) devices) are often battery powered to provide mobility and convenience. Reducing the power consumption of wireless communication devices may extend battery life and thereby increase the time between battery recharging or replacement.

Wireless communication devices may receive transmitted radio frequency (RF) signals and perform one or more processing steps to recover transmitted data. The quality of the received RF signal may vary widely based on, for example, operating and/or environmental conditions. For example, if a wireless receiver and transmitter are near each other, then the received signal quality may be high and the transmitted data may be easy to recover. On the other hand, if the wireless receiver and transmitter are far apart, or if one or more signal blockers exist between the wireless receiver and transmitter, then the received signal quality may be low, and the transmitted data may be difficult to recover.

Wireless receivers may include receivers that accommodate a wide range of RF signals. However, recovering transmitted data from a high-quality RF signal may be easier and may require less power than recovering transmitted data from a low quality RF signal. Therefore, wireless receivers may expend more power than necessary when receiving and processing higher quality RF signals. Thus, there is a need to reduce the power consumption of wireless RF receivers without decreasing operating bandwidth.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

An apparatus and method are disclosed that may enable a wireless device to adaptively control power consumption expended by its wireless receiver. In a first example, a method is disclosed and may include receiving a radio-frequency (RF) signal via a configurable front-end of a wireless device, determining a power metric for the wireless device, wherein the power metric indicates an amount of available power to the wireless device, determining a link quality metric based at least in part on a signal from a circuit to harvest power from the received RF signal, determining a configuration of the configurable front-end based at least in part on the power metric and the link quality metric; and configuring the configurable front-end based at least in part on the determined configuration.

In another example, a wireless device is disclosed and may include a configurable front-end configured to receive an RF signal, a controller, and a memory configured to store instructions that, when executed by the controller, cause the wireless device to determine a power metric, wherein the power metric indicates an amount of power available to the wireless device, determine a link quality metric based at least in part on a signal from a circuit to harvest power from the received RF signal, determine a configuration of the configurable front-end based at least in part on the power metric and the link quality metric, and configure the configurable front-end based at least in part on the determined configuration.

In another example, another method may include receiving a radio-frequency (RF) signal via a configurable front-end of a wireless device, determining an operating metric based at least in part on a signal indicating an amount of power harvested from the received RF signal, and configuring the configurable front-end based at least in part on the operating metric.

BRIEF DESCRIPTION OF THE DRAWINGS

Aspects of the present disclosure are illustrated by way of example and are not intended to be limited by the figures of the accompanying drawings. Like numbers reference like elements throughout the drawings and specification.

DETAILED DESCRIPTION

Figure 1:
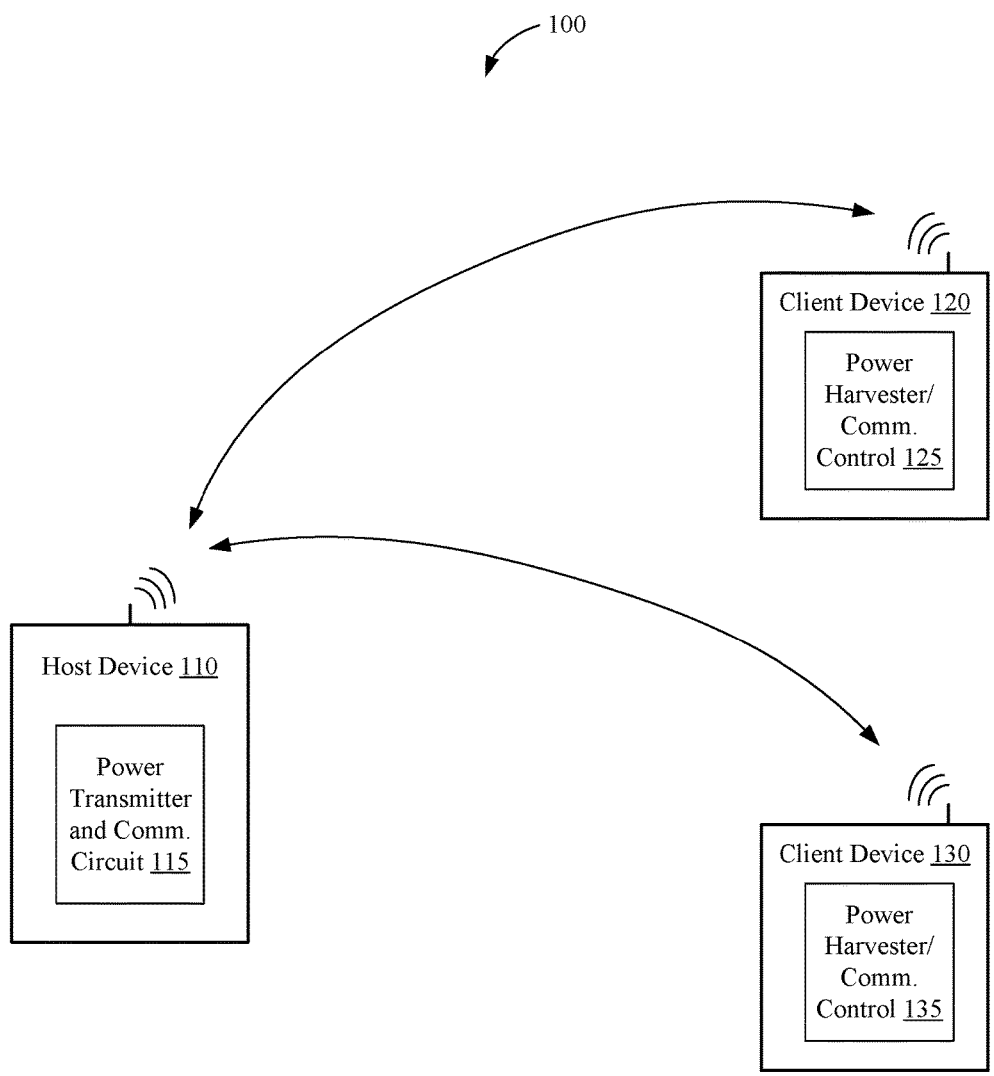
FIG. 1 depicts a wireless communication system 100 within which aspects of the present disclosure may be implemented

In the following description, numerous specific details are set forth such as examples of specific components, circuits, and processes to provide a thorough understanding of the disclosure. The term "coupled" as used herein means coupled directly to or coupled through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described below. The non-transitory computer-readable storage medium may form part of a computer program product, which may include packaging materials.

The non-transitory computer-readable storage medium may include random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a computer-readable communication medium that carries or communicates code in the form of instructions or data structures and that may be accessed, read, and/or executed by a computer or other processor.

The various illustrative logical blocks, modules, circuits and instructions described in connection with the implementations disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. In some implementations, a state machine may include or be coupled to any memory as described above. Thus, operation of the state machine may include retrieval and execution of instructions stored in a memory. A processor may also be implemented as a combination of computing devices (such as a combination of a DSP and a microprocessor), a plurality of microprocessors, one or more microprocessors in conjunction with a DSP core, or any other suitable configuration.

FIG. 1 depicts a wireless communication system 100 within which aspects of the present disclosure may be implemented. The wireless communication system 100 may include one or more wireless communication devices such as a host device 110 and client devices 120 and 130. The host device 110 and the client devices 120 and 130 may be any suitable wireless communication device. Example wireless communication devices may include a cell phone, personal digital assistant (PDA), tablet device, laptop computer, or any other suitable portable device. The host device 110 and the client devices 120 and 130 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

For ease of explanation and clarity, the wireless communication system 100 depicts a single host device 110 and two client devices 120 and 130. In other embodiments, the wireless communication system 100 may include any technically feasible number of host devices and/or client devices. The host device 110 and the client devices 120 and 130 may communicate with each other via one or more technically feasible wireless communication protocols. In some implementations, the host device 110 and the client devices 120 and 130 may communicate with each other (and with other devices not shown for simplicity) via Wi-Fi, Bluetooth®, Bluetooth Low Energy (BLE), Long Term Evolution (LTE), or any other suitable communication protocol. In some other implementations, the host device 110 and client devices 120 and 130 may operate within the 900 MHz band, the 2.4 GHz industrial, scientific, and medical (ISM) band, the 5 GHz ISM band, the 60 GHz band, or any other technically feasible frequency band.

The host device 110 may be powered by a battery or through an external power source (not shown for simplicity) and be well suited to transmit power via RF energy to the client devices 120 and/or 130. In some implementations, the host device 110 may include a power transmitter/communication circuit 115. The power transmitter/communication circuit 115 may provide communications functionality to transmit and receive data through any technically feasible communication protocol. For example, the power transmitter/communication circuit 115 may include a transceiver to wirelessly transmit and receive data between the host device 110 and a number of other devices (such as the client devices 120 and 130). In addition, the power transmitter/communication circuit 115 may convert power from a local power source into RF energy that may be transmitted to other wireless devices (such as the client devices 120 and 130).

The client device 120 may include a power harvesting/communication circuit 125 to transmit and receive data and capture (e.g., harvest) power from transmitted RF signals. For example, the power harvester/communication circuit 125 may include a transceiver to wirelessly transmit and receive data between the client device 120 and the host device 110, between the client device 120 and the client device 130, and/or between the client device 120 and one or more other wireless devices (not shown for simplicity). In some implementations, the power harvesting/communication circuit 125 may transmit and receive data via a Wi-Fi, Bluetooth®, Bluetooth Low Energy (BLE), Long Term Evolution (LTE), or any other suitable communication protocol.

The power harvesting/communication circuit 125 may harvest power from RF signals (e.g., RF energy) transmitted by the host device 110 (or any other nearby device that transmits or emits RF energy). In this manner, some or all of the operations of the client device 120 may be powered by RF energy transmitted from the host device 110.

In some aspects, the RF energy may be transmitted within frequency bands that may be shared with other transceivers provided within the client device 120. In one implementation, the host device 110 may transmit a paging signal to communicate with the client device 120 and also provide power that may be harvested. The paging signal may include one or more RF pre-charging pulses. The RF pre-charging pulses may be used to power, at least partially, the client device 120.

Similar to the client device 120, the client device 130 may also include a power harvester/communication circuit 135 to harvest power from transmitted RF energy and provide communication functionality.

Figure 2:
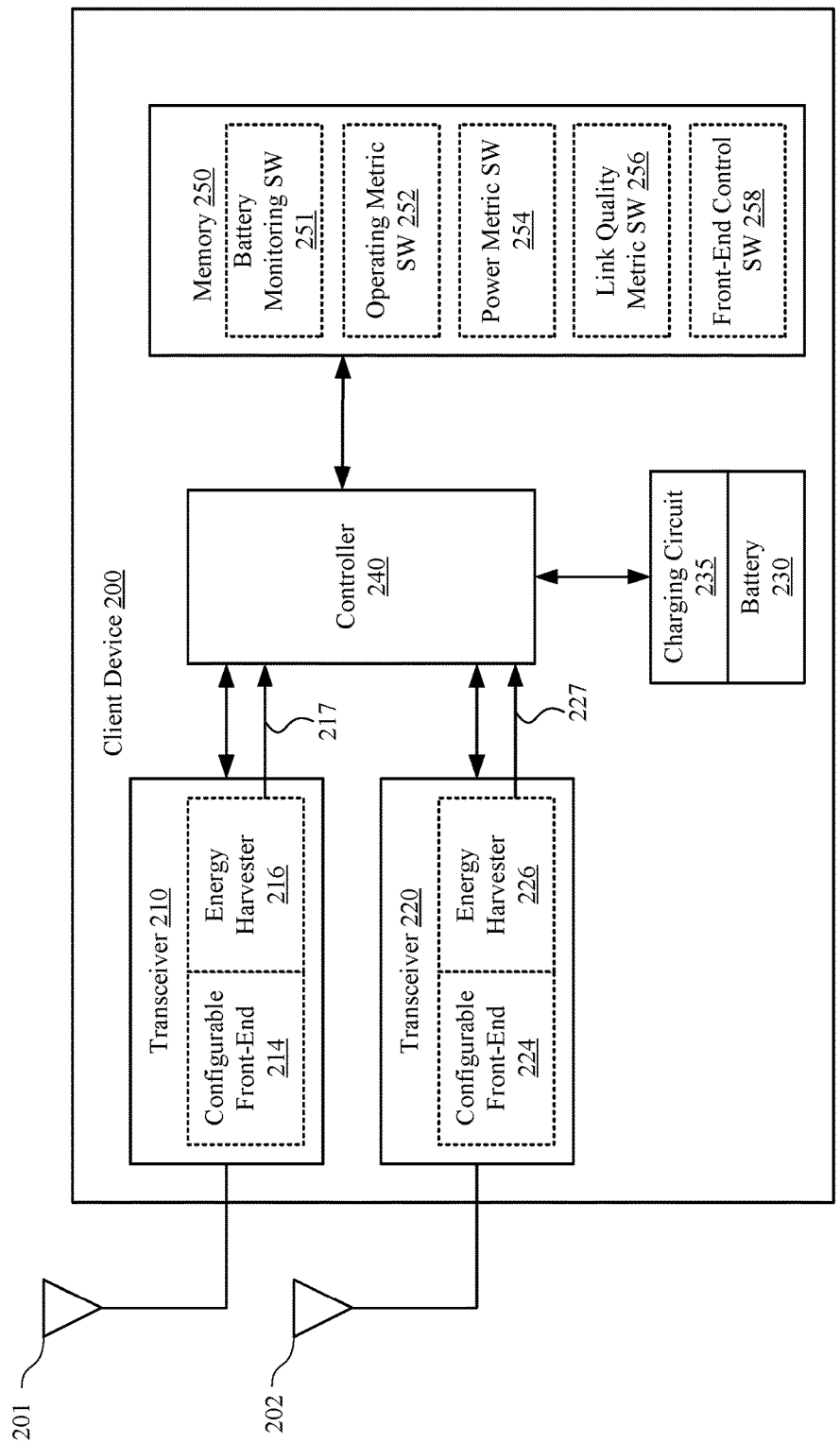
FIG. 2 is a block diagram of an example client device.

FIG. 2 is a block diagram of an example client device 200. The client device 200 may be an implementation of the client device 120 and/or the client device 130 of FIG. 1. The client device 200 may include antennas 201 and 202, transceivers 210 and 220, a battery 230, a charging circuit 235, a controller 240, and a memory 250. Although two antennas and two transceivers are shown in the example of FIG. 2, in other implementations, the client device 200 may include any suitable number of antennas and transceivers. The transceiver 210 may be coupled directly or indirectly to the antenna 201, and the transceiver 220 may be coupled directly or indirectly to the antenna 202. The transceivers 210 and 220 may be implementations of the power harvester/communication circuits 125 and 135 of respective client devices 120 and 130 of FIG. 1.

The transceiver 210 may transmit and receive wireless data from other wireless devices, including the host device 110. In addition, the transceiver 210 may harvest energy from RF signals to power, at least in part, the client device 200. The transceiver 210 may include a configurable front-end 214 and an energy harvester 216. The configurable front-end 214 may be coupled to the antenna 201 and may include analog and/or digital processing blocks to receive and recover transmitted data from a RF signal. In some aspects, the configurable front-end 214 may be selectively configured to reduce power consumption in response to operating conditions. The energy harvester 216 may also be coupled to the antenna 201 (in some implementations via the configurable front-end 214) and may include circuits to receive and convert the RF energy into a voltage and/or current. In one implementation, the energy harvester 216 may provide a strong RF indicator signal 217 to the controller 240 to indicate that a strong RF signal is being received and that energy is being harvested. The energy harvester 216 may harvest energy from strong RF signals but may not be able to harvest energy from other RF signals. In another implementation, the strong RF indicator signal 217 may indicate that the received RF signal has an associated signal strength of −10 dBm or more.

The controller 240 may configure the configurable front-end 214 based on the strong RF indicator signal 217. Similarly, the transceiver 220 may include a configurable front-end 224 and an energy harvester 226. The configurable front-end 224 may be similar to the configurable front-end 214 and the energy harvester 226 may be similar to the energy harvester 216. The energy harvester 226 may provide a strong RF indicator signal 227 to the controller 240 to indicate that a strong RF signal is begin received and, in some cases, that energy is being harvested. In some implementations, the strong RF indicator signals 217 and 227 may indicate how much energy is being harvested.

The configurable front-ends 214 and 224 may be configured to trade power consumption for performance. For example, transmitted data may be recovered from strong RF signals using fewer hardware stages or processing steps (thereby reducing power consumption). Conversely, transmitted data may be recovered from weak RF signals using more power hardware stages or processing steps (thereby increasing power consumption). Operation of the configurable front-ends 214 and/or 224 is described in more detail below in conjunction with FIGS. 3-9.

The battery 230 may provide some or all of the power to operate the client device 200. The charging circuit 235 may charge the battery 230 either through an external power supply (such as an AC powered source not shown for simplicity) or from the energy harvesters 216 and 226.

The memory 250 may include a non-transitory computer-readable storage medium (such as one or more nonvolatile memory elements, such as EPROM, EEPROM, Flash memory, a hard drive, etc.) that may store the following software modules:

- a battery monitoring software (SW) module 251 to monitor status and charge condition of the battery 230, for example as described below with respect to FIGS. 3-11;
- an operating metric SW module 252 to determine an operating metric associated with the client device 200, for example as described below with respect to FIGS. 3-9;
- a power metric SW module 254 to determine a power metric associated with the client device 200, for example as described below with respect to FIGS. 10-11;
- a link quality metric SW module 256 to determine a link quality metric associated with the client device 200, for example as described below with respect to FIGS. 10-11; and
- a front-end control software (SW) module 258 to control operations of the configurable front-ends 214 and 224, for example, as described below for one or more operations associated with FIGS. 7 and 10.

The controller 240, which may be coupled to the transceivers 210 and 220, and the memory 250, may be any one or more suitable controllers or processors capable of executing scripts or instructions of one or more software programs stored in the client device 200 (e.g., within the memory 250). In some embodiments, the controller 240 may be implemented with a hardware controller, a processor, a state machine, or other suitable circuits to provide the functionality of the controller 240 executing instructions stored in the memory 250.

The controller 240 may execute the battery monitoring SW module 251 to determine a battery charge state of the battery 230. For example, the battery monitoring SW module 251 may determine whether the battery is fully charged, fully discharged or any other feasible charge state. In some implementations, execution of the battery monitoring SW module 251 may determine a battery capacity associated with the battery 230 and may also determine if power is being provided by an external power supply (not shown for simplicity). Operations of the battery monitoring SW module 251 are described in more detail below in conjunction with FIGS. 3-11.

The controller 240 may execute the operating metric SW module 252 to determine an operating metric associated with the client device 200. In some implementations, the operating metric may describe operating conditions of the client device 200. The operating metric may describe signal quality characteristics, detected interference, and system information associated with the client device 200. Operations of the operating metric SW module 252 are described in more detail below in conjunction with FIGS. 3-9.

The controller 240 may execute the power metric SW module 254 to determine a power metric associated with the client device 200. In some implementations, execution of the power metric SW module 254 may determine an indicator describing a power state of the client device 200. The power state may include battery charge information, battery capacity information, and information regarding an external power supply. Operation of the power metric SW module 254 is described in more detail below in conjunction with FIGS. 10-11.

The controller 240 may execute the link quality metric SW module 256 to determine a link quality metric associated with the client device 200. In some implementations, execution of the link quality metric SW module 256 may determine an indicator describing link quality of an RF signal received by the client device 200. In some implementations, execution of the link quality metric SW module 256 may determine an indicator describing link quality (for example, received signal strength, detected signal blockers and the like) of a received RF signal. Operation of the link quality metric SW module 256 is described in more detail below in conjunction with FIGS. 10-11.

The controller 240 may execute the front-end control SW module 258 to control and/or configure a configurable front-end (such as the configurable front-ends 214 and 224). In some implementations, execution of the front-end control SW module 258 may control and/or configure a configurable front-end based at least in part on the operating metric determined by the operating metric SW module 252. In another implementation, execution of the front-end control SW module 258 may control and/or configure a configurable front-end based at least in part on a power metric determined by the power metric SW module 254 and a link quality metric determined by the link quality metric SW module 256. Operations of the front-end control SW module 258 are described in more detail below in conjunction with FIGS. 3-9.

Figure 3:
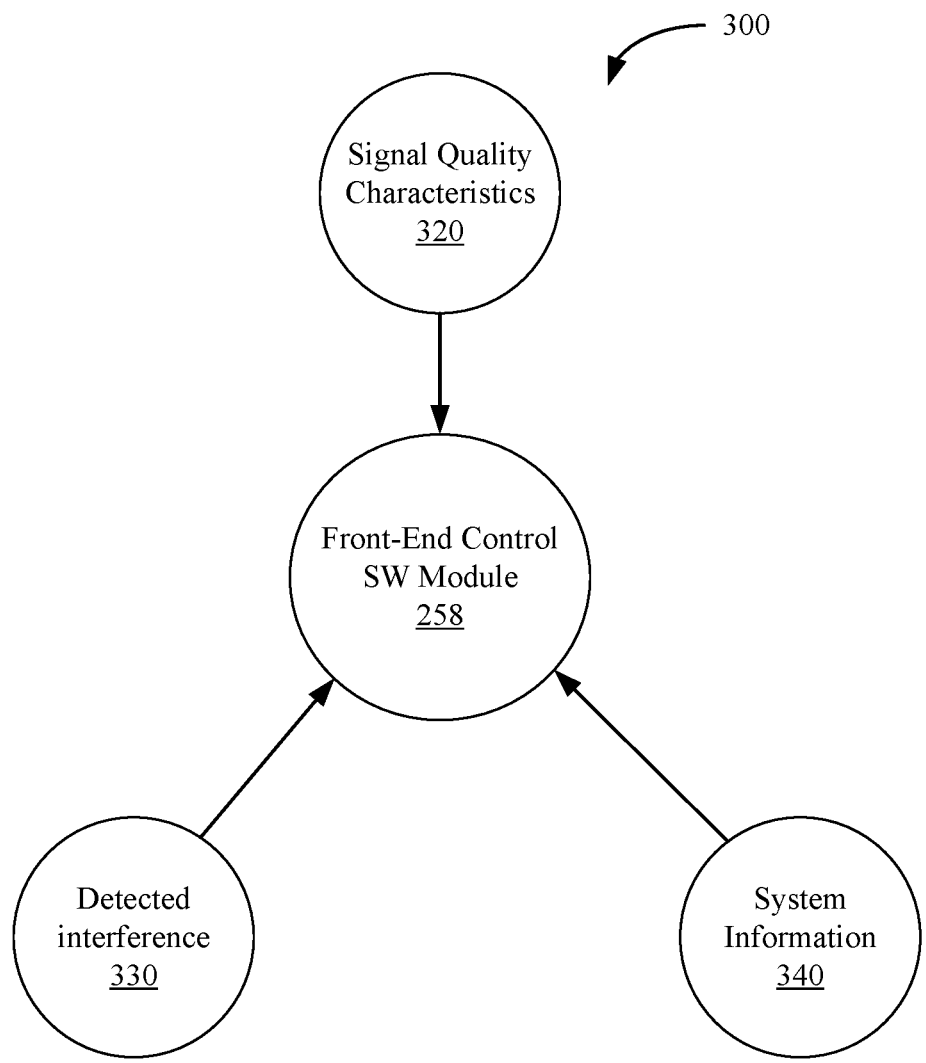
FIG. 3 is a simplified diagram illustrating example parameters that may be considered by the front-end control software of FIG. 2

FIG. 3 is a simplified diagram 300 illustrating example parameters that may be considered by the front-end control SW module 258 of FIG. 2. In some implementations, the front-end control SW module 258 may configure a configurable front-end (such as the configurable front-end 214 and/or the configurable front-end 224) in response to parameters such as signal quality characteristics 320, detected interference 330, and/or system information 340.

The front-end control SW module 258 may receive signal quality characteristics 320 to configure the configurable front-end 214 or 224. In some implementations, signal quality characteristics 320 may determine, at least in part, whether the received RF signal is strong or weak. As used herein, a strong RF signal may correspond to a signal having a power level greater than a value, and a weak RF signal may correspond to a signal having a power level that is less than (or equal to) the value. The signal quality characteristics 320 may include receive signal power, received signal quality, received timing/frequency error and drift, and/or a packet error rate or retry rate information. In one implementation, a receive signal power indicator may be a received signal strength indicator (RSSI) provided by the transceiver 210 or 220. Large amounts of error and/or drift may indicate a weak RF signal. A packet error may occur when a weak RF signal is received and the transmitted data cannot be recovered. A large packet error rate may, therefore, indicate a weak RF signal. Further, a high retry rate (e.g., a rate of signal retransmissions determined, for example, by comparing the retry rate to a threshold) may also indicate a weak RF signal. The front-end control SW module 258 may configure the configurable front-end 214 and/or 224 to use more processing steps and/or more hardware stages to recover data from a weak RF signal. On the other hand, the front-end control SW module 258 may configure the configurable front-end 214 and/or 224 to use fewer processing steps and/or fewer hardware stages to recover data from a strong RF signal In some implementations, the signal quality characteristics 320 may include received signal quality information provided by the energy harvester 216 and/or 226. The received signal power indicator may indicate the presence of a strong RF signal or that energy is being harvested by the energy harvester 216 or 226. If the received signal quality indicator indicates that a strong RF signal is being received or that power is being harvested, then the front-end control SW module 258 may configure the configurable front-end 214 or 224 to user fewer processing steps and/or fewer hardware stages to recover the transmitted data. On the other hand, if the received signal quality indicator indicates that a strong RF signal is not being received or that power is not being harvested, then the front-end control SW module 258 may configure the configurable front-end 214 or 224 to use more processing steps and/or more hardware stages to recover the transmitted data. In some implementations, the receive signal power indicator may be compared to a threshold to determine whether a strong (or weak) RF signal is received. Additional signal quality characteristics may be considered but not mentioned here.

The front-end control SW module 258 may also receive detected interference 330 to configure the configurable front-end 214 or 224. When the client device 200 operates in the presence of one or more signal blockers, recovery of the transmitted data may be more difficult than when the client device operates in the absence of signal blockers. Therefore, additional signal filtering or other processing steps and/or additional hardware stages (compared to a present configuration of the configurable front-end 214 or 224) may be used to receive and recover transmitted data when operating in the presence of signal blockers. On the other hand, fewer signal processing steps and/or fewer hardware stages (again, compared to a present configuration of the configurable front-end 214 or 224) may be used to receive and recover transmitted data when operating in the absence of signal blockers. The detected interference 330 may include signal blocker information provided by background scanning, inferred signal blocker power based on adjacent/alternate channel power sensor, and inferred signal blocker power based on the difference between total received RF power (including any blocker) and power filtered signal power after out-of-band blockers are removed. Background scanning (e.g., scanning by a transceiver when not transmitting an RF signal) may provide information regarding signal blockers within a wireless communication channel used by the client device 200. For example, background scanning may provide signal strength information associated with signal blockers.

In some implementations, signal blocker power may be inferred by measuring power within an adjacent or alternate wireless communication channel. If measured adjacent or alternate channel power is high (e.g., when compared to a threshold), then the client device 200 may be operating in the presence of a signal blocker. On the other hand, if the measured adjacent or alternate channel power is not high (e.g., lower than a threshold), then the client device 200 may not be operating in the presence of a signal blocker. In some implementations, signal blocker power may be an inferred power based on a difference between total received RF power and power filtered signal power without out-of-band blockers. Therefore, the front-end control SW module 258 may configure the configurable front-end 214 or 224 to use more processing steps and/or hardware stages when a signal blocker is present or use fewer processing steps and/or hardware stages when a signal blocker is not present.

The front-end control SW module 258 may also receive system information 340 to configure the configurable front-end 214 or 224. The system information 340 may include, for example, application information (e.g., use information) of the client device 200. For example, the application information may indicate that the client device 200 is operating as a wireless mouse or keyboard, wireless sensor, camera, etc. Because typical transmission distances associated with a wireless mouse or keyboard are typically limited to only a few feet, the front-end control SW module 258 may configure the configurable front-end 214 or 224 to preferentially use fewer processing steps and/or hardware stages to receive and decode the transmitted data. On the other hand, if the additional information indicates that the client device 200 is not operating as a wireless mouse or keyboard but rather as a sensor, for example, the front-end control SW module 258 may configure the configurable front-end 214 or 224 to use additional processing steps and/or additional hardware stages to receive and decode the transmitted data.

In another implementation, the system information 340 may include information indicating the amount of data to be transferred. Large amounts of data (e.g., an amount that is greater than a threshold) may be more efficiently received (e.g., fewer data retransmissions) by configuring the configurable front-end 214 or 224 to use additional processing steps and/or additional hardware stages to receive and decode the transmitted data. On the other hand, smaller amounts of data (e.g., an amount that is less than a threshold) may be received and decoded by the configurable front-end 214 or 224 using fewer processing steps and/or fewer hardware stages to conserve power even if occasional retries are required.

In some implementations, the system information 340 may include urgency or latency information. Urgent communications or communications with a low latency time may benefit from additional processing steps and/or additional hardware stages. Therefore, the front-end control SW module 258 may configure the configurable front-end 214 or 224 to use additional processing steps and/or additional hardware stages when urgent communications or a low latency time is indicated in the system information 340. On the other hand, the front-end control SW module 258 may configure the configurable front-end 214 or 224 to use fewer processing steps and/or fewer hardware stages when urgent communications or low latency times are not indicated in the system information 340.

The system information 340 may include intended use information such as, for example, mobile use or stationary use information. When the system information 340 includes mobile usage information, the front-end control SW module 258 may configure the configurable front-end 214 or 224 to use fewer processing steps and/or fewer hardware processing stages to reduce power consumption. On the other hand, when the system information 340 includes stationary usage information, power may be supplied by an external power supply. Therefore, the front-end-control SW module 258 may configure the configurable front-end 214 or 224 to use more processing steps and/or more hardware stages since power may be provided by the external power supply instead of a limited capacity battery.

The system information 340 may include battery state information. When the battery state information indicates a low battery charge (e.g., compared to a battery charge threshold) then the front-end control SW module 258 may configure the configurable front-end 214 and/or 224 to use fewer processing steps and/or fewer hardware processing stages. On the other hand, when the battery state information indicates a sufficient battery charge, then the front-end control SW module 258 may configure the configurable front-end 214 or 224 to use more processing steps and/or more hardware processing stages to receive and recover the transmitted data. Additionally, or alternatively, the system information 340 may include battery capacity information. The battery capacity information may be used together with battery state information to indicate a charge capacity information associated the battery.

The system information 340 may include information regarding nearby devices and their operating frequencies. Nearby devices may cause interference, especially if the nearby devices are operating in or near the same frequencies used by the client device 200. Thus, if the system information 340 includes information indicating the presence of nearby devices and/or devices using the same or nearby operating frequencies, the front-end control SW module 258 may configure the configurable front-end 214 or 224 to use more processing steps and/or more hardware processing stages to recover the transmitted data (e.g., to overcome potential interference). On the other hand, if the system information 340 includes information indicating that there are no nearby devices and/or devices using the same or nearby operating frequencies, then the front-end control SW module 258 may configure the configurable front-end 214 or 224 to use fewer processing steps and/or fewer hardware processing stages to recover the transmitted data.

Figure 4:
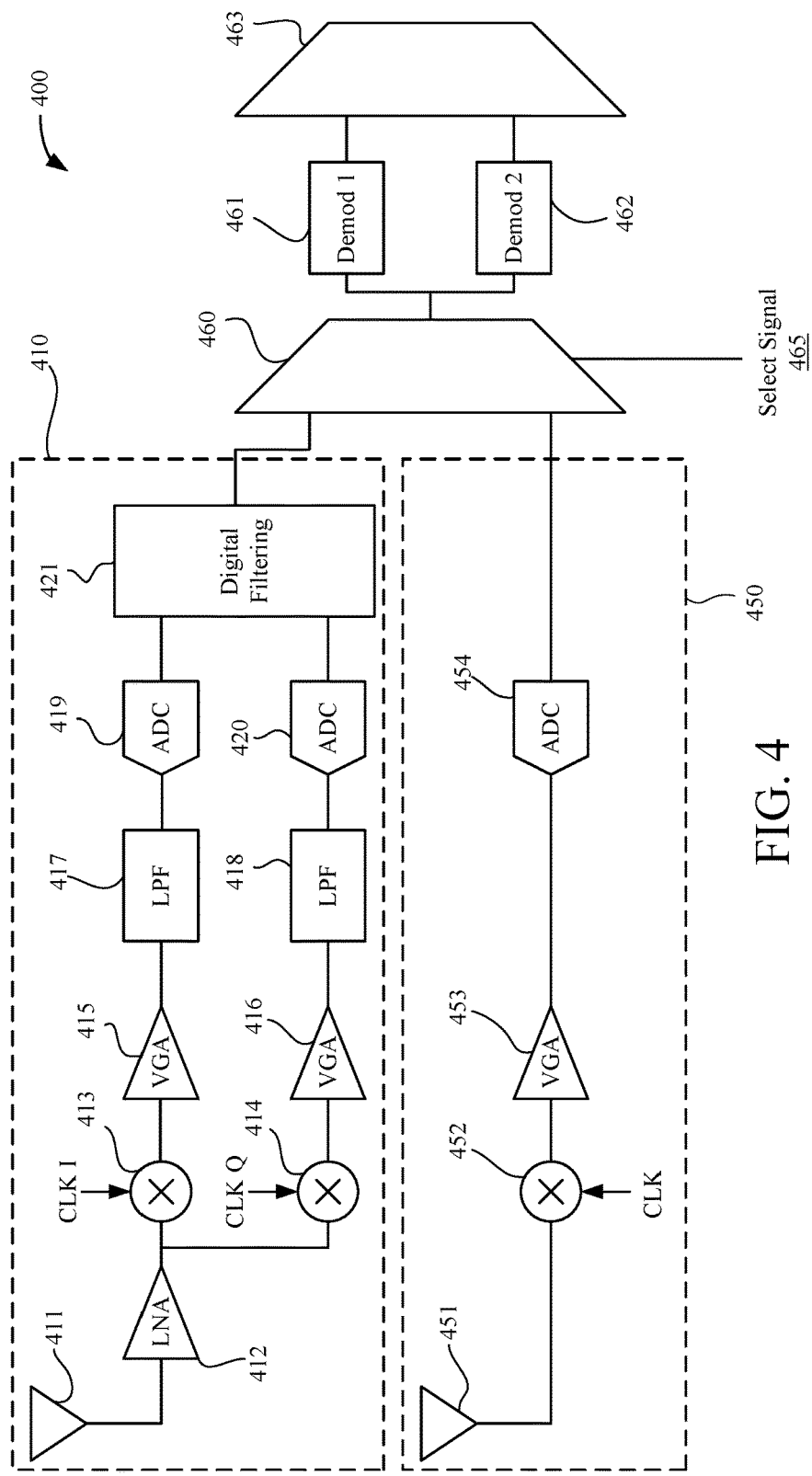
FIG. 4 is a block diagram depicting one example of a configurable front-end.

FIG. 4 is a block diagram depicting one example of a configurable front-end 400. The configurable front-end 400 may an implementation of the configurable front-end 214 or 224 of FIG. 2. The configurable front-end 400 may include a first receive chain 410, a second receive chain 450, a first selector 460, a first demodulator 461, a second demodulator 462, and a second selector 463. The second receive chain 450 may be a reduced feature receive chain that includes fewer hardware stages and/or capabilities than the first receive chain 410. In some implementations, first receive chain 410 may be used to receive and process weak RF signals, while the second receive chain 450 may be used to receive and process strong RF signals. In other implementations, the first receive chain 410 may be used to process not only weak RF signals, but also "normal" RF signals having power levels less than strong RF signals. For such implementations, weak RF signals: $0<\text{RF signal power}<V_1$, normal RF signals: $V_1<\text{RF signal power}<V_2$, and strong RF signals: $V_2<=\text{RF signal power}$. Since the second receive chain 450 includes fewer hardware stages and/or capabilities than the first receive chain 410, the second receive chain 450 may consume less power than the first receive chain 410.

The first receive chain 410 may include an antenna 411, a low noise amplifier (LNA) 412, a first mixer 413, a second mixer 414, a first variable gain amplifier (VGA) 415, a second VGA 416, a first low pass filter (LPF) 417, a second LPF 418, a first analog-to-digital converter (ADC) 419, a second ADC 420, and a digital filtering block 421. The first receive chain 410 may receive quadrature-encoded RF signals. For example, a quadrature-encoded RF signal may be received by the antenna 411 and amplified by the LNA 412. The first mixer 413 may mix (e.g., multiply) the amplified RF signal with an in-phase clock signal (denoted as CLK I). The mixed signal may be amplified by and filtered by the first LPF 417. The filtered output signal output from the first LPF 417 may be sampled by the first ADC 419.

The second mixer 414 may mix the amplified RF signal output from the LNA 412 with a quadrature clock signal (denoted as CLK Q). The mixed signal may be amplified by and filtered by the second LPF 418. The filtered output signal output from the second LPF 418 may be sampled by the second ADC 420. Output signals from the first ADC 419 and the second ADC 420 may be combined and filtered by the digital filtering block 421. An output signal from the digital filtering block 421 may be provided to the first selector 460.

In some implementations, the first receive chain 410 may be designed to receive and process a range of transmitted RF signals varying in signal strength from weak to very strong. The range of permitted signal strengths may be specified by a communication standard (e.g., IEEE 802.11 standards, one or more Bluetooth standards set forth by the Bluetooth Special Interest Group, or similar). In addition, performance of some hardware stages may be specified by communication standards. For example, LPF filter parameters (frequency cut off point, amount of attenuation, etc.) may be determined at least in part by a communication standard. Performance, design, and/or selection of other hardware stages may also be based on communication standards such as ADC resolution, word width, sample rate, and digital filtering to process the received signal.

When the client device 200 is receiving a strong RF signal, the receive chain may be simplified. The simplified receive chain may trade signal processing capabilities for power savings. For example, the simplified receive chain may not satisfy one or more performance requirements associated with a particular communication standard. The simplified receive chain may only be able to receive and recover data from strong RF signals. However, since the received RF signal is strong, the reduced capabilities of the simplified receive chain may not adversely affect the reception and decoding of the strong RF signal. The simplified receive chain may reduce the power consumption of the client device. The second receive chain 450 may be one implementation of a simplified receive chain.

The second receive chain 450 may include an antenna 451, a third mixer 452, a third VGA 453, and a third ADC 454. The hardware stages of the second receive chain 450 may be simplified versions (e.g., lower performing versions) of corresponding hardware stages included within the first receive chain 410. In addition, the simplified hardware stages may consume less power than corresponding hardware stages of the first receive chain 410.

In some implementations, a strong quadrature-encoded RF signal may be received by the antenna 451. Since the RF signal is strong, an LNA may not be needed between the antenna 451 and the third mixer 452. In some aspects, a full quadrature demodulation may not be necessary to at least partially decode the strong RF signal. Thus, the third mixer 452 may be used to mix a single clock signal (denoted CLK) with the strong RF signal. In some implementations, the CLK signal may be either an in-phase clock signal or a quadrature clock signal. The mixed signal from the third mixer 452 is provided to the third VGA 453. Compared to the first VGA 415 and the second VGA 416, the third VGA 453 may have a smaller gain range. A VGA with a large gain range may consume more power than a VGA with a smaller gain range. Further, a large gain range may not be necessary since the RF signal is strong. The amplified signal from the third VGA 453 is provided to the third ADC 454. The third ADC 454 may have less resolution than the first ADC 419 or the second ADC 420. In addition, the sampling rate of the third ADC 454 may be slower compared to the first ADC 419 or the second ADC 420. An ADC with less resolution and/or and ADC running at a slower sampling rate may use less power than an ADC with relatively more resolution and/or an ADC running at a higher sampling rate. The output of the third ADC 454 is provided to the first selector 460.

The first selector 460 may select the output of the first receive chain 410 or the second receive chain 450 based on a select signal 465. For example, when the select signal 465 is driven to a first state, the output of the first receive chain 410 may be selected. When the select signal 465 is driven to a second state, the output of the second receive chain 450 may be selected. In some implementations, when one of the outputs of one of the receive chains is selected, the unused receive chain may be powered down or placed in a standby mode. Thus, power may be saved by not powering the unused receive chain.

The output of the first selector 460 is provided to the first demodulator 461 and the second demodulator 462. The first demodulator 461 may be a "full feature" demodulator used to demodulate RF signals including quadrature encoded RF signals. The second demodulator 462 may be a simplified demodulator capable of partial demodulation of a received RF signal. In some implementations, the first demodulator 461 may consume more power than the second demodulator 462.

The output of the first demodulator 461 and the second demodulator 462 are coupled to the second selector 463. In some implementations, the unused demodulator (e.g., the demodulator whose output is not selected by the second selector 463), may be powered down or placed in a standby mode.

Although only two receive chains (first receive chain 410 and second receive chain 450) are shown here for simplicity, in other implementations, the configurable front-end 400 may include any feasible number of receive chains.

Figure 5:
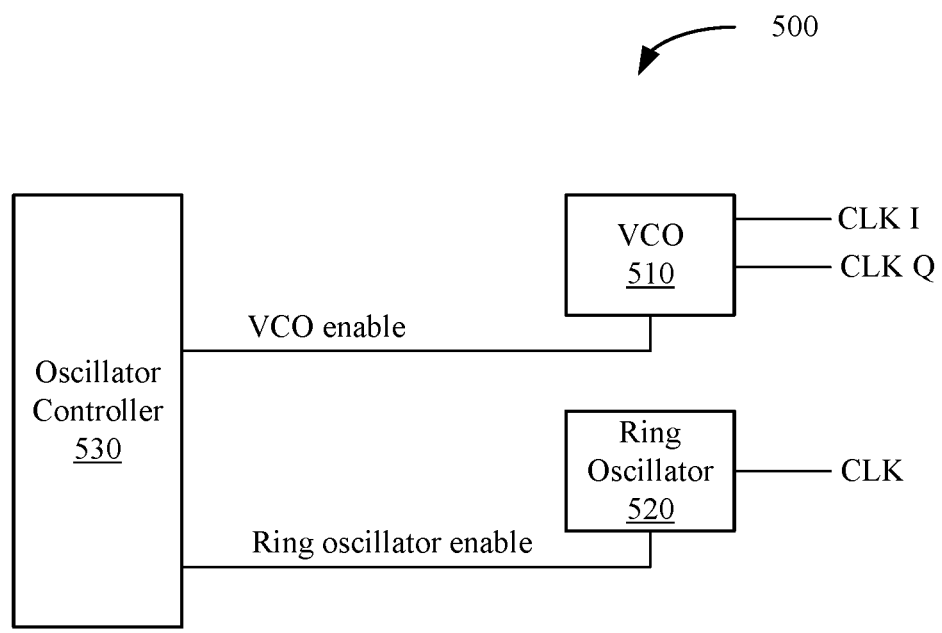
FIG. 5 is a block diagram of a clock system.

FIG. 5 is a block diagram of a clock system 500. The clock system 500 may be included within the client device 200 of FIG. 2 (not shown in FIG. 2 for simplicity). The clock system 500 may include a voltage controlled oscillator (VCO) 510, a ring oscillator 520, and an oscillator controller 530. The clock system 500 may provide clock signals for the first receive chain 410 and/or the second receive chain 450 of FIG. 4. In some implementations, the VCO 510 may be an oscillator with low phase noise that generates both the CLK I and the CLK Q signals. The ring oscillator 520 may be an oscillator with high phase noise that generates the CLK signal. The ring oscillator 520 may consume less power than the VCO 510. In some implementations, instead of a single CLK signal, the ring oscillator 520 may generate the CLK I and CLK Q signals (not shown for simplicity).

The oscillator controller 530 may control operations of the VCO 510 and the ring oscillator 520. For example, the oscillator controller 530 may enable the VCO 510 while disabling (e.g., placing in a low-power or standby mode) the ring oscillator 520, thereby enabling the clock system 500 to provide low phase noise clock signals while increasing power consumption. In another example, the oscillator controller 530 may enable the ring oscillator 520 while disabling the VCO 510, thereby enabling the clock system 500 to provide a high phase noise clock while reducing power consumption.

In some implementations, the front-end control SW module 258 may configure the configurable front-end 214 or 224 by determining an operating metric based at least in part on signal quality characteristics 320, detected interference 330, and/or system information 340. The operating metric may provide an indication of the operating conditions of the client device 200. In some implementations, a low or small operating metric (e.g., less than a first threshold) may indicate that RF signal is received and the associated data recovered with a high and unacceptable number of errors. In response thereto, the front-end control SW module 258 may configure the configurable front-end 214 or 224 to increase power consumption and use more processing steps or hardware stages to process the RF signal to reduce the number of errors. On the other hand, a high or large operating metric (e.g., greater than a second threshold) may indicate that the RF signal is received and the associated data is recovered with a small number of errors. In response thereto, the front-end control SW module 258 may configure the configurable front-end 214 or 224 to decrease power consumption and use fewer processing steps or fewer hardware stages to process the RF signal. Operation of the front-end control SW module 258 is described below in conjunction with FIGS. 6-9.

Figure 6:
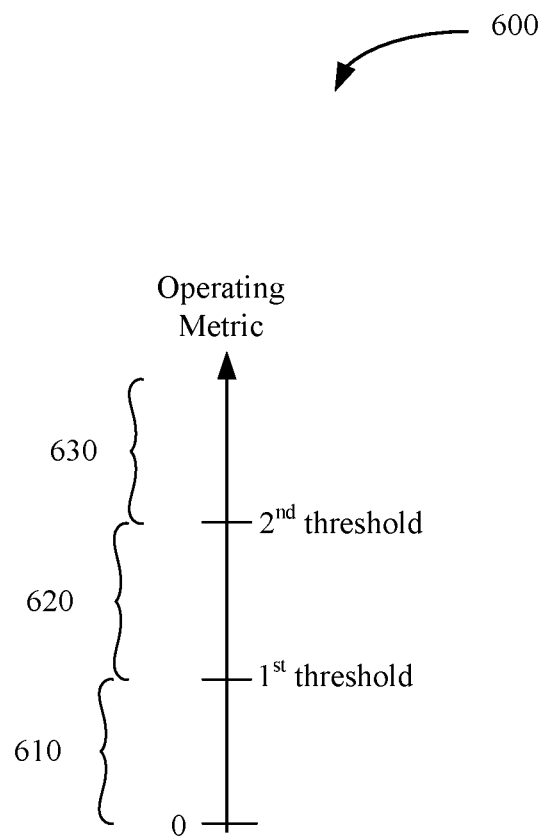
FIG. 6 is a simplified graph depicting an example relationship between an operating metric and regions of operation of a client device.

FIG. 6 is a simplified graph 600 depicting an example relationship between the operating metric and regions of operation of the client device 200. The graph 600 shows three operating regions. A first region 610 may correspond to an operating metric that is less than a first threshold. When the client device 200 is operating in the first region 610, the number of errors associated with the received RF signal may exceed a first amount. In some implementations, when the number of errors exceeds the first amount, the transmitted data cannot be recovered. In response to operating in the first region 610, the front-end control SW module 258 may enable more hardware stages and/or processing steps to increase the operating metric (thereby reducing the number of errors).

A third region 630 may correspond to an operating metric that is greater than a second threshold. When the client device 200 is operating in the third region 630, the number of errors may be less than a second amount. In some implementations, when the number of errors is less than the second amount, the additional errors may be tolerated and the transmitted data may still be recovered. In response to operating in the third region 630, the front-end control SW module 258 may enable fewer hardware stages and/or processing steps to reduce power consumption but increase the number of errors.

A second region 620 may correspond to an operating metric that is between the first threshold and the second threshold. When the client device 200 is operating in the second region 620, the number of errors may be less than the first amount, but more than the second amount. In response to operating in the second region 620, the front-end control SW module 258 may not change the number of hardware stages or processing steps used to recover the transmitted data. In this region, the number of errors may be acceptable and allow the transmitted data to be recovered.

Figure 7:
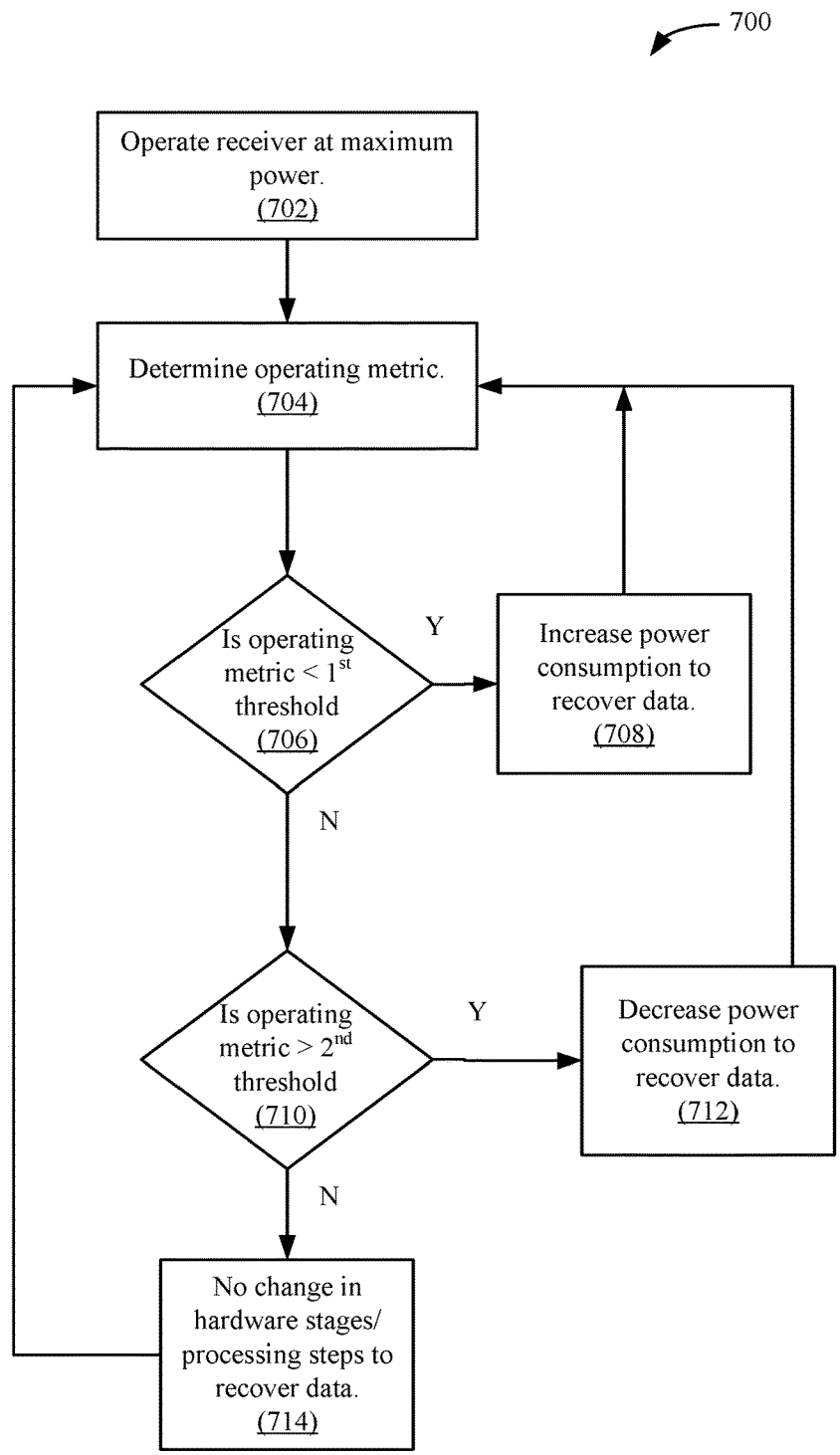
FIG. 7 is a flowchart depicting an example operation for operating a client device, in accordance with some embodiments.

FIG. 7 is a flowchart depicting an example operation 700 for operating a client device, in accordance with some embodiments. In some implementations, the client device described herein may be the client device 200 of FIG. 2, the client device 120 or the client device 130 of FIG. 1, or any other suitable device. The operation 700 is described herein as performed by the controller 240 executing the front-end control SW module 258. In other implementations, the operation 700 may be performed by any other suitable controller or processor. The operation begins as the controller 240 operates a configurable front-end in a maximum power consuming configuration (702). The configurable front-end may be the configurable front-end 214. In other implementations, the configurable front-end may be the configurable front-end 224 or any other suitable configurable front-end. In the maximum power consuming configuration, most or all of the available hardware stages and/or processing steps associated with the configurable front-end 214 may be operated. When the configurable front-end 214 is in the maximum power consuming configuration, an RF signal received through the configurable front-end 214 may receive the most processing available and, the transmitted data may be recovered with the lowest error rate. Thus, operating the configurable front-end 214 in this manner may provide the highest operating metric for any received RF signal.

Next, the controller 240 determines the operating metric (704). The operating metric may provide an indication of error rate and/or operating conditions. In some implementations, the operating metric may be determined based on signal quality characteristics 320, detected interference 330, and/or system information 340 as described with respect to FIG. 3. Next, the controller 240 compares the determined operating metric to a first threshold (706). In some implementations, if the operating metric is less than the first threshold, then the error rate may be unacceptably high. If the operating metric is less than the first threshold, then the controller 240 may configure the configurable front-end 214 to increase power consumption to recover the data from the RF signal (708). For example, the controller 240 may use more hardware stages and/or more processing steps within the configurable front-end 214 to recover the data from the RF signal. Thus, power consumption may be increased while improving data recovery. Managing the use of hardware stages and/or processing steps is described in more detail below in conjunction with FIGS. 8 and 9. The operation then returns to 704.

If the operating metric is not less than the first threshold (as tested in 706), then the operating metric is compared to a second threshold (710). The second threshold may be associated with an error rate/performance level that is acceptable. In some implementations, the second threshold may be related to the first threshold. For example, the second threshold may be a percentage (e.g., 10%) greater than the first threshold. The first threshold in combination with the second threshold may provide hysteresis with respect to changing the configuration of the configurable front-end 214. Thus, if the operating metric is greater than the second threshold, then the controller 240 may configure the configurable front-end 214 to decrease power consumption to recover the data from the RF signal (712). For example, the controller 240 may use fewer hardware stages and/or fewer processing steps to recover the data from the RF signal. Thus, power consumption may be reduced while recovering the transmitted data within an acceptable error rate. The operation then returns to 704.

If the operating metric is not greater than the second threshold, then the controller 240 makes no changes to the hardware stages and/or processing steps to recover transmitted data (714). The operation returns to 704. Although operations 708, 712, and 714 each return to 704, the return to and execution of 704 need not be immediate. The repeated execution of operation 700 enables the controller 240 to adapt to operating conditions, conserve power, and recover transmitted data. In some implementations, the execution of 704 may occur as each data packet is received. In some other implementations, the operation 700 may return to 702 as each data packet is received. In some other implementations, the operation 700 may be performed periodically. For example, another device may transmit a periodic beacon or broadcast signal to trigger the controller 240 to configure the configurable front-end 214.

As described above, the controller 240 may change how the received RF signal is processed (e.g., change a configuration of the configurable front-end 214) based on a determined operating metric. Using more processing steps and/or hardware stages may improve the recovery of transmitted data at a higher level of power consumption. Using fewer processing steps or hardware stages may reduce power consumption while degrading the recovered data. The configurable front-end 214 may include many different processing steps and hardware stages that may be configured/enabled/disabled to affect power consumption and data recovery. Some of the possible changes that may be applied to an analog receive path are described below in conjunction with FIG. 8. Some of the possible changes that may be applied to a digital configuration of the configurable front-end 214 are described below in conjunction with FIG. 9.

Figure 8:
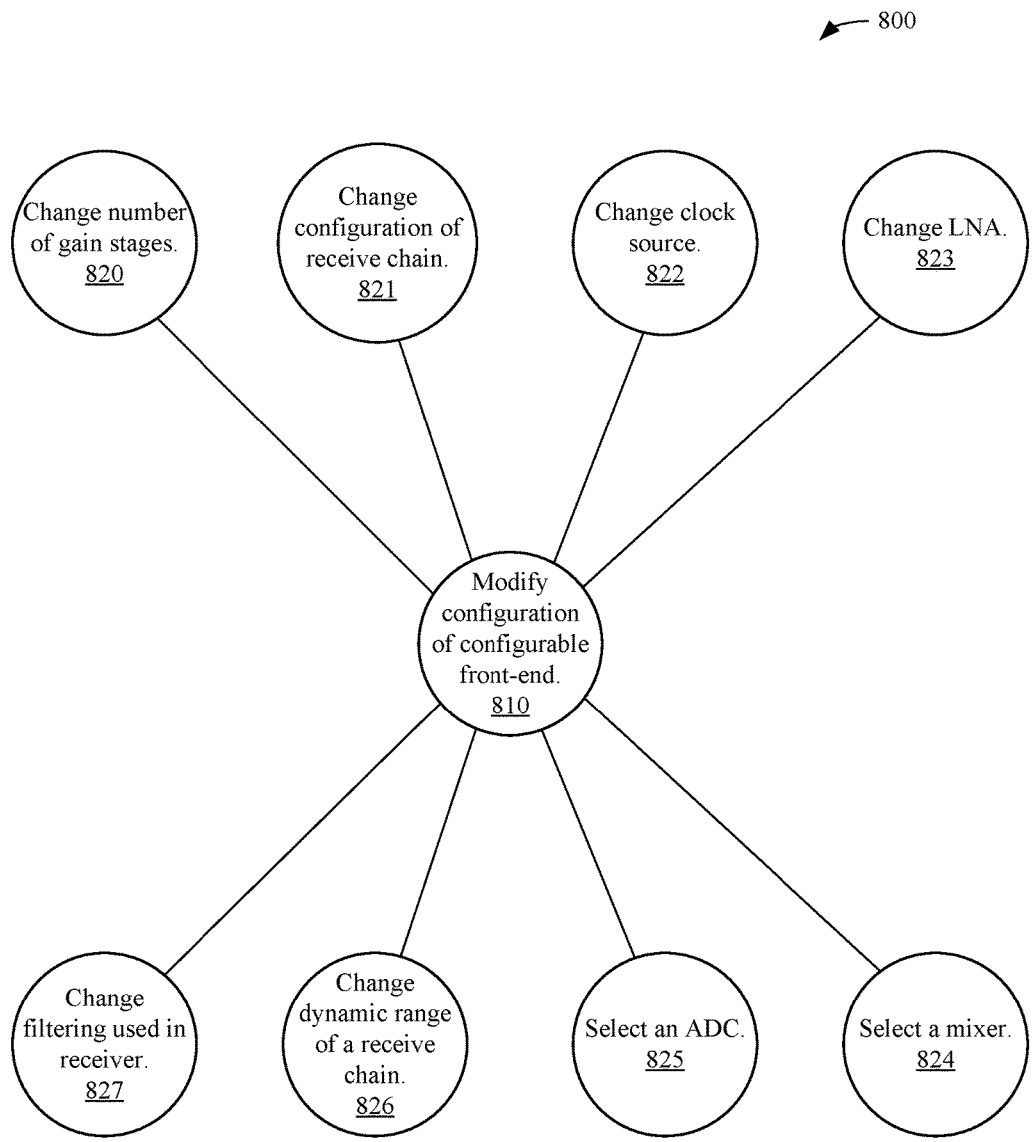
FIG. 8 is a diagram depicting example operations that may be performed to modify analog operations associated with a configurable front-end of the client device.

FIG. 8 is a diagram 800 depicting example operations that may be performed to modify the analog operations associated with a configurable front-end of the client device 200. The operations described herein are described with respect to the configurable front-end 214. In other implementations, operations described herein may apply to the configurable front-end 224 or any other suitable front-end or circuit. The diagram 800 shows a modify an analog configuration of the configurable front-end operation 214 (810) which may correspond to the increase power consumption operation 708 or the decrease power consumption operation 712 of FIG. 7.

One operation to modify the configuration of the configurable front-end 214 may include changing the number of gain stages (820). Using additional gain stages may improve (increase) the determined operating metric while also increasing power consumption. On the other hand, using fewer gain stages may decrease the determined operating metric and decrease power consumption. Therefore, the controller 240 of FIG. 2 may use additional gain stages with respect to operation 708 or use fewer gain stages with respect to operation 712. In some implementations, the configurable front-end 214 may include several additional gain stages (e.g., LNAs, VGAs, etc.). that may be used (e.g., enabled) to improve the operating metric and increase power consumption or bypassed (e.g., disabled) to decrease power consumption and decrease the operating metric.

Another operation to modify the configuration of the configurable front-end 214 may include changing a configuration of a receive chain (821). For example, in a first configuration the receive chain may perform a quadrature signal demodulation (e.g., use two mixers, an in-phase signal and a quadrature signal) to recover the transmitted data. One example of a receive chain that may perform a quadrature signal demodulation may be the first receive chain 410 of FIG. 4. In a second configuration, the receive chain may perform a one-half quadrature signal demodulation (e.g., use one mixer and one clock signal) to recover the transmitted data. One example of a receive chain that may perform a one-half quadrature modulation may be the second receive chain 450. Therefore, the controller 240 may change a receive chain configuration in response to a determined operating metric. For example, the controller 240 may configure the receive chain to perform quadrature signal demodulation corresponding to operation 708 or perform one-half quadrature signal demodulation corresponding to operation 712.

Another operation to modify the configuration of the configurable front-end 214 may include changing the clock source (822). For example, a first clock source may be a ring oscillator. The ring oscillator may consume less power compared to a VCO but may have a higher phase noise that may reduce the operating metric. A second clock source may be a VCO. The VCO may consume more power than the ring oscillator, but may have a lower phase noise that may increase the operating metric. Therefore, the controller 240 may configure the configurable front-end 214 by selecting the ring oscillator corresponding to operation 712 or selecting the VCO corresponding to operation 708 in response a determined operating metric.

Another operation to modify the configuration of the configurable front-end 214 may include changing an LNA selection (823). For example, the configurable front-end 214 may include a first LNA which may have a first noise figure and a first level of power consumption. The configurable front-end 214 may also include a second LNA which may include a second noise figure (higher than the first noise figure) and a second level of power consumption (lower than the first level of power consumption). Therefore, the controller 240 may configure the configurable front-end 214 by selecting the first LNA to corresponding to the operation 708 or the second LNA corresponding to the operation 712 in response to a determined operating metric. In some implementations, the configurable front-end 214 may include several different LNAs that may be selected (e.g., enabled) based on the operating metric.

Another operation to modify the configuration of the configurable front-end 214 may include selecting a mixer (824). For example, the configurable front-end 214 may include a first mixer which may be an active mixer (e.g., a gilbert cell mixer or suitable active mixer). The configurable front-end 214 may also include a second mixer which may be a passive mixer (e.g., a diode based mixer or any other suitable passive mixer). The first mixer may improve the operating metric while increasing power consumption, whereas the second mixer may reduce power consumption while reducing the operating metric. Therefore, the controller 240 may configure the configurable front-end 214 by selecting the first mixer corresponding to the operation 708 or the second mixer corresponding to the operation 712 in response a determined operating metric.

Another operation to modify the configuration of the configurable front-end 214 may include selecting an ADC (825). For example, the configurable front-end 214 may include a first ADC which may have a first resolution (e.g., a first number of bits) bits that may improve the operating metric while increasing power consumption. The configurable front-end 214 may also include a second ADC which may have a second resolution (e.g., a second number of bits less than the first number of bits) that may reduce the operating metric while decreasing power consumption. Therefore, the controller 240 may configure the configurable front-end 214 by selecting the first ADC corresponding to the operation 708 or selecting the second ADC corresponding to the operation 712 in response a determined operating metric.

Another operation to modify the configuration of the configurable front-end 214 may include changing the dynamic range of a receive chain (826). For example, a first configuration of a receive chain may have a dynamic range that may enable reception of both weak and strong RF signals. The first configuration may improve the operating metric while increasing power consumption. A second configuration of the receive chain may have a reduced dynamic range that may enable the reception of very strong RF signals. The second configuration may reduce the operating metric, while decreasing power consumption. Therefore, the controller 240 may configure the configurable front-end 214 by selecting the first configuration corresponding to the operation 708 or the second configuration corresponding to the operation 712 in response a determined operating metric.

Another operation to modify the configuration of the configurable front-end 214 may include changing the filtering used in the configurable front-end 214 (827). For example, in a first configuration the configurable front-end 214 may use a passive filter with a reduced dynamic range. The passive filter may decrease the operating metric, while reducing power consumption. In a second configuration, the configurable front-end 214 may use an active filter with a wide dynamic range (e.g., with respect to the passive filter). The active filter may increase the operating metric, while increasing power consumption. Therefore, the controller 240 may configure the configurable front-end 214 by selecting the passive filter corresponding to the operation 712 or selecting the active filter corresponding to the operation 708 in response to a determined operating metric.

Figure 9:
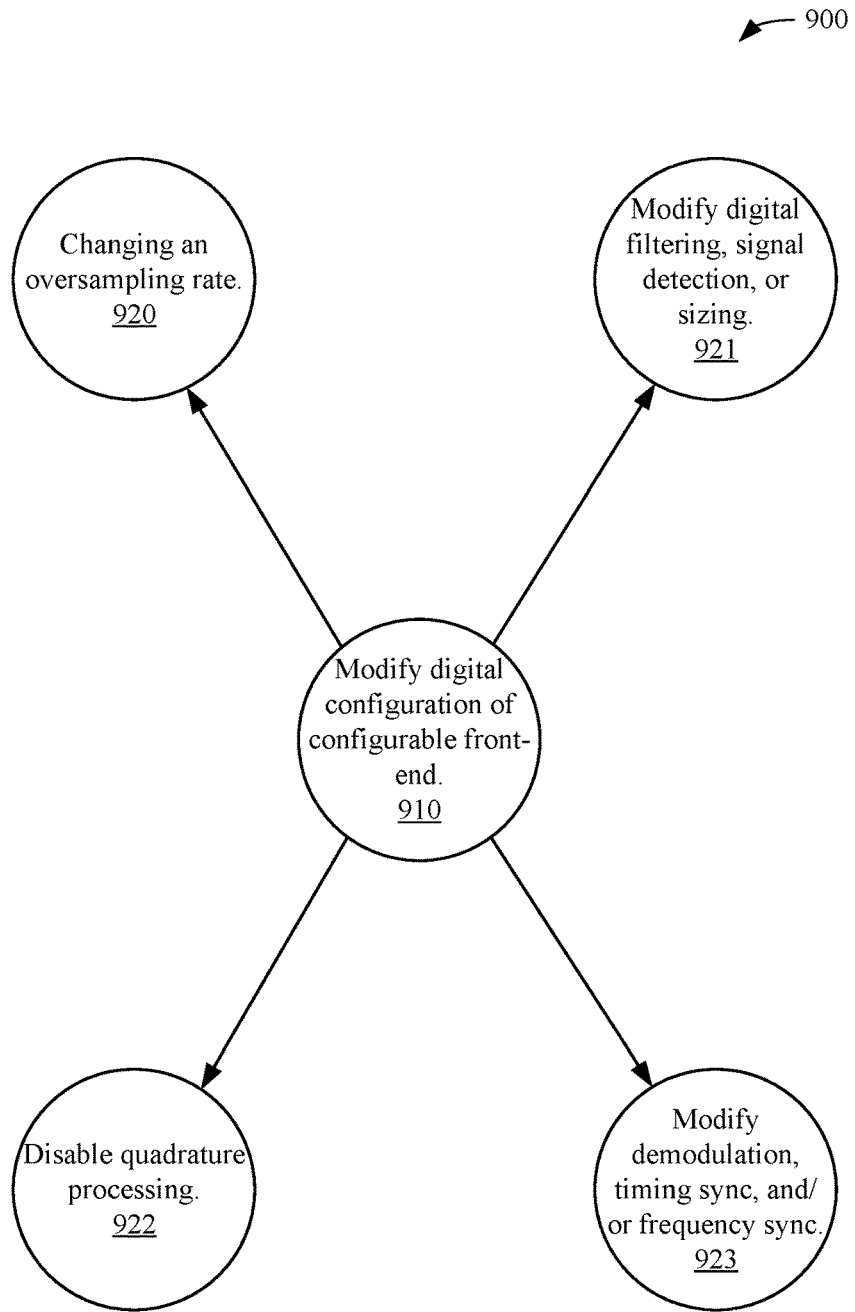
FIG. 9 is a diagram depicting example operations that may be performed to modify digital operations associated with a configurable front-end of the client device.

FIG. 9 is a diagram 900 depicting example operations that may be performed to modify the digital operations associated with a configurable front-end of the client device 200. The operations described herein are described with respect to the configurable front-end 214. In other implementations, operations described herein may apply to the configurable front-end 224 or any other suitable front-end or circuit. The diagram 900 shows a modify a digital configuration of the configurable front-end 214 operation (910) which may correspond to the operation 708 or the operation 712 of FIG. 7.

One operation to modify the digital configuration of the configurable front-end 214 may include changing an oversampling rate (920). A faster oversampling rate (e.g., a clock rate of an ADC included in the configurable front-end 214) may increase the operating metric by extending a dynamic range of an associated receive chain (while increasing power consumption). A slower oversampling rate may decrease the operating metric (while reducing power consumption). Therefore, the controller 240 may configure the configurable front-end 214 to increase oversampling rate corresponding to the operation 708 or to decrease the oversampling rage corresponding to the operation 712 in response to the determined operating metric.

Another operation to modify the digital configuration of the configurable front-end 214 may include modifying digital filtering, signal detection, and/or sizing (921). For example, if no strong interference blocker is present, digital filtering is not need and the actual sizing of digital signal can be adjusted to avoid using a width digital word. These configurations can reduce power consumption.

Another operation to modify the digital configuration of the configurable front-end 214 may include disabling digital quadrature processing (922). For example, digital processing of only in-phase or quadrature data samples may decrease the operating metric while reducing power consumption. In some implementations, data may be recovered at least in part from very strong RF signals using only in-phase or quadrature data samples. On the other hand, digital processing of both in-phase and quadrature data samples may increase the operating metric while increasing power consumption. Therefore, the controller 240 may configure the configurable front-end 214 to processes both in-phase and quadrature data samples corresponding to the operation 708 or process just the in-phase or quadrature data samples corresponding to the operation 712 in response to the determined operating metric.

Another operation to modify the digital configuration of the configurable front-end 214 may include modifying demodulation, timing synchronization, and/or frequency synchronization (923). With a strong signal with a large signal-to-noise ratio, simpler and less power-hungry techniques for demodulation, synchronization can be used. However, to successfully decode a weak, distorted signal, sophisticated algorithms for demodulation and synchronization are required. Such algorithms typically require substantial logic and consume more power.

FIGS. 6-9 describe configuration of a configurable front-end based on a single operating metric. Thus, based on a value of the operating metric, additional or fewer processing steps and/or hardware stages may be used by the configurable front-end to recover data from a received RF signal. In some other implementations, configuration of a configurable front-end may be based on two metrics. This is described below in conjunction with FIGS. 10 and 11.

Figure 10:
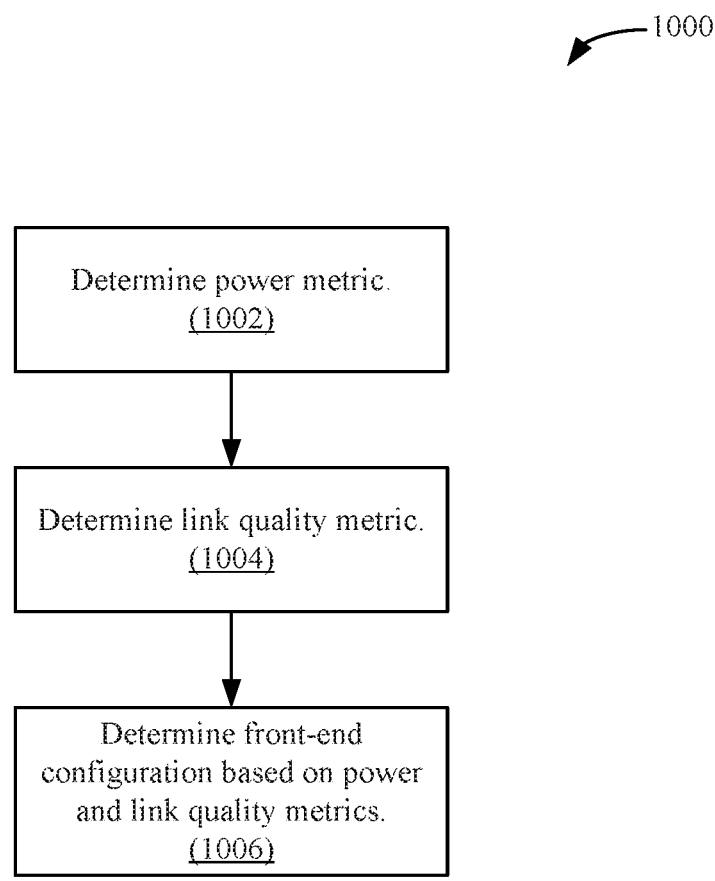
FIG. 10 is a flowchart depicting another example operation for operating a client device.

FIG. 10 is a flowchart depicting another example operation 1000 for operating a client device. In some implementations, the client device described herein may be the client device 200 of FIG. 2, the client device 120 or the client device 130 of FIG. 1, or any other suitable device. The operation 1000 is described herein as performed by the controller 240 executing the battery monitoring SW module 251, the power metric SW module 254, the link quality metric SW module 256 and/or the front-end control SW module 258. In other implementations, the operation 1000 may be performed by any other suitable controller or processor.

The operation begins as the controller 240 determines a power metric (1002). In some implementations, the power metric may be determined by the controller 240 executing the power metric SW module 254 and/or the battery monitoring SW module 251. The power metric may provide an indication of an amount of power available to operate the client device. For example, the power metric may be based on power resources available to the client device. In some implementations, the power metric may be based on battery charge and/or battery capacity. A fully charged battery may provide a higher power metric than a partially or fully discharged battery. The power metric may alternatively or additionally be based on a determination of whether power is supplied by an external power source. For example, if the client device is powered by an external power supply (such as an AC power supply), then the amount of available power may be unlimited (or limited only by the presence of AC power). As a result, the associated power metric may be high. In some implementations, the power metric may alternatively or additionally be based at least in part on a signal from an energy harvesting circuit (such as the energy harvesters 216 and 226).

In some other implementations, the power metric may be determined by a formula based at least in part on a weighted sum of various power resources.

$$\text{Power Metric} = w_1 Rsc_1 + w_2 Rsc_2 + \ldots + w_i Rsc_i \quad \text{(equation 1)}$$

Where: $Rsc_i$ is an ith power resource (e.g., battery charge, battery capacity, determination of external power source, etc.); and $w_i$ is a corresponding ith weighting factor.

In some implementations, the power Metric may be normalized such that the value of the power metric may range from 0 (a minimum power capacity) to 100 (a maximum power capacity). For example, if a power resource is an external power supply powered by an external power source, then the associated power metric may be 100. In another example, a power resource may be battery charge and/or battery capacity. The amount of battery charge may be weighted by 50% ($w_i=0.5$) and the battery capacity may be weighted 25% ($w_i=0.25$). Therefore, a higher power metric may indicate larger power reserves that may be used to power the client device. Thus, the client device 200 may be configured to consume more power than when the power metric is low. Although only three power resources are described here for simplicity, other power resources are contemplated. For example, other possible power resources may be described above with respect to system information 340 of FIG. 3.

Next, the controller 240 determines a link quality metric (1004). In some implementations, the link quality metric may be determined by the controller 240 executing the link quality metric SW module 256. The link quality metric may describe an overall quality of a communication link used by the client device to receive an RF signal. In some implementations, the link quality metric may be based on an RSSI of the received RF signal. In another implementation, the link quality metric may be based on a signal from the energy harvester 216 or 226. For example, if the signal from the energy harvester 216 or 226 indicates that energy is being harvested, then the associated signal strength of the received RF signal may be relatively large (compared to when no energy is being harvested). A large RF signal may provide a large link quality metric while a small RF signal may provide a low link quality metric. In another implementation, packet error rate, detected signal blockers, detected interference, and/or urgent communications may be used to determine the link quality metric. High packet error rates, large numbers of detected signal blockers, large amounts of detected interference, and the presence of urgent communications may provide a low link quality metric. On the other hand, low packet error rates, small numbers of detected signal blockers, small amounts of detected interference, and an absence of urgent communications may provide a high link quality metric.

In some embodiments, the link quality metric may be based on the signal quality characteristics 320, the detected interference 330, and the system information 340 described above with respect to FIG. 3. In some implementations, the link quality metric may be determined by a weighted sum of various link quality indicators.

$$\text{Link Quality Metric} = y_1 L q i_1 + y_2 L q i_2 + \ldots + y_i L q i_i \quad \text{(equation 2)}$$

Where: $Lqi_i$ is an ith link quality characteristic; and
$y_i$ is an ith weighting factor.

In some implementations, the link quality metric may be normalized such that the value of the link quality metric may range from 0 (a minimum link quality) to 100 (a maximum link quality). A low link quality metric may indicate a poor communication link while a high link quality metric may indicate a good communication link. In response to a low link quality metric, additional processing steps and/or hardware stages may be used by a configurable front-end to receive and decode an RF signal. Possible link quality indicators may include RSSI, a signal from energy harvesters 216 and 226, packet error rate, detected signal blockers, detected interference, and/or urgent communications as described above. Other link quality indicators are contemplated. For example, other link quality indicators may be described above with respect to the signal quality characteristics 320 of FIG. 3.

Next, the controller 240 determines a configuration of a configurable front-end based at least in part on the power and link quality metrics (1006). In some implementations, the configurable front-end may use additional or fewer processing steps and/or hardware stages to receive and decode RF signals in response to low power and/or link quality metrics. For example, the configurable front-end may use additional or fewer gain stages, additional or fewer filtering stages, additional or fewer digital filtering stages, using a VCO or a ring oscillator clock source, using additional or fewer ADC bits and/or a higher or lower sampling rate, and increased or decreased analog signal sensitivity in response to the power and link quality metrics. In some implementations, other configuration changes associated with the configurable front-end may be made, such as those described above with respect to FIGS. 2-5.

In some implementations. the configuration of the configurable front-end may be based on a selection matrix of possible configurations using the power metric and the link quality metric. An example approach is described below in conjunction with FIG. 11.

Figure 11:
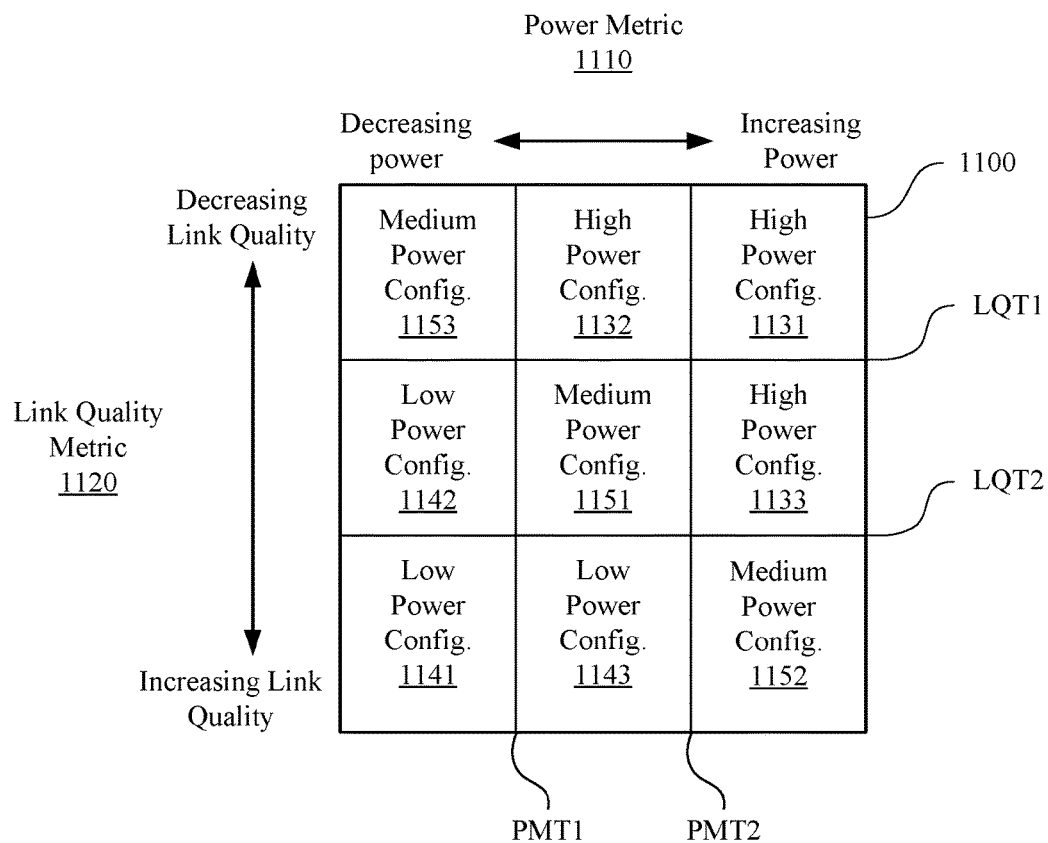
FIG. 11 is an example selection matrix for determining a configuration of a configurable front-end.

FIG. 11 is an example selection matrix 1100 for determining a configuration of a configurable front-end. Possible power metrics are shown across the top of the selection matrix 1100. As shown, a low power metric is to the left and a high power metric is to the right of the selection matrix 1100. Thus, an increasing power metric goes from left to right. Possible link quality metrics are shown on the left side of the selection matrix 1100. A low link quality metric is toward the top of the selection matrix 1100 and a high link quality metric is toward the bottom of the selection matrix 1100. Thus, an increasing link quality metric goes from the top to the bottom of the selection matrix 1100.

The power metric 1110 may be compared to a first power metric threshold PMT1 and a second power metric threshold PMT2. If the power metric 1110 is less than the first power metric threshold PMT1, then the power metric 1110 may fall within the first column of the selection matrix 1100. If the power metric 1110 is greater than the first power metric threshold PMT1, but less than the second power metric threshold PMT2, then the power metric 1110 may fall within the middle column of the selection matrix. If the power metric 1110 is greater than the second power metric threshold PMT2, then the power metric 1110 may fall in the right column of the selection matrix 1100. In this manner, the power metric 1110 may be used to index a first dimension of the selection matrix 1100.

In a similar manner, the link quality metric 1120 may be compared to a first link quality threshold LQT1 and a second link quality threshold LQT2. Thus, the link quality metric 1120 may fall within the upper row, the middle row, or the lower row. In this manner, the link quality metric 1120 may be used to index a second dimension of the selection matrix 1100.

A configurable front-end (for example, the configurable front-end 214 and/or 224) may be configured through the selection matrix 1100. Each entry in the selection matrix 1100 may represent a different configuration (sometimes referred to as a power profile) of the configurable front-end. The example selection matrix 1100 shows nine possible independent power profiles. For ease of explanation, three different power profiles are described herein (a high, medium, and lower power configuration). In other embodiments, the selection matrix 1100 may include any feasible number of distinct power profiles. By way of example and not limitation, a high power configuration may use full resolution ADCs, a high quality VCO, full I and Q signal processing to receive and decode RF signals. Similarly, a medium power configuration may use reduced resolution ADC and slower sampling rates (compared to the high power configuration) to receive and decode RF signals thereby consuming moderate amounts of power (compared to the high power configuration). A low power configuration may use reduced resolution ADCs and LNAs, and slower sampling rates (compared to corresponding elements of the medium power configuration) to receive and decode RF signals, thereby consuming less power (compared to the medium power configuration). The above descriptions associated with the high, medium, and low power configurations are simplified for ease of discussion. Each configuration (power profile) may include settings for one or more of the hardware stages and/or processing steps described above with respect to FIGS. 3-5, but not described here for simplicity.

In a first example, if the power metric 1110 is greater than the second power metric threshold PMT2 and the link quality metric 1120 is less than the first link quality threshold LQT1, then the configurable front-end may be configured to have a high power configuration 1131. Other high power configurations 1132 and 1133 may be similar to the high power configuration 1131. The high power configuration 1131 may be a configuration of a configurable front-end that consumes more power than a medium power configuration and a low power configuration. The high power metric may indicate that the client device 200 has sufficient (greater than a threshold) power resources. Further, the low signal quality metric may indicate that the RF signal may be difficult to receive and decode. For example, the configurable front-end may be configured in the high power configuration 1131 and use substantially all available processing steps and/or hardware stages to receive the RF signal (full resolution ADC, high-quality VCO, full I and Q processing, etc.).

In another example, if the power metric 1110 is less than the first power metric threshold PMT1 and the link quality metric 1120 is greater than the second link quality threshold LQT2, then the configurable front-end may be configured to operate in a low power configuration 1141. The low power configuration 1141 may be a configuration of the configurable front-end that consumes less power than the high power configuration 1131. Other low power configurations 1142 and 1143 may be similar to the low power configuration 1141. A low power metric 1110 may indicate low power resources (a low battery, for example) and a high link quality metric 1120 may indicate a strong RF signal. Thus, the configurable front-end may be configured to operate in a low power configuration to use fewer processing steps and/or hardware stages to conserve power while receiving a strong RF signal. For example, the configurable front-end may be configured to operate in the low power configuration 1141 to use a reduced resolution ADC, a ring oscillator, and a slower sample rate.

In another example, if the power metric 1110 is between the first power metric threshold PMT1 and the second power metric threshold PMT2, and the link quality metric is between the first link quality threshold LQT1 and the second link quality threshold LQT2, then the configurable front-end may be configured to operate in a medium power configuration 1151. A medium power configuration 1151 may use more power than the low power configuration 1141, but less power than the high power configuration 1131. Other medium power configurations 1152 and 153 may be similar to the medium power configuration 1151. When operating in the medium power configuration 1151, the configurable front-end may use more hardware stages and/or processing steps than a low power configuration 1141 and fewer hardware stages and/or processing steps than the high power configuration 1131.

The high power configuration, the medium power configuration, and the low power configuration described above are meant to be illustrative rather than limiting. Other numbers of configurations (less than or more than three) are possible. Furthermore, the detailed configuration associated with each power configuration described above has been omitted for clarity. Persons skilled in the art will appreciated that many possible configurations may exist for each power configuration. In some implementations, a configuration may change as the client device 200 operates to enable the link quality metric 1120 and the power metric 1110 to continually or periodically guide operation of the configurable front-end. For example, if the power metric 1110 is relatively low (lower than a threshold), then the configurable front-end may be configured to compromise performance for power. That is, to conserve power, the configurable front-end may use a minimal number of processing steps and/or hardware stages to receive the RF signal. The limited (minimal) configuration may not allow weak RF signals to be decoded, but may extend battery life. In another example, if the power metric 1110 is relatively high, then the configurable front-end may use a near maximal number of processing steps and/or hardware stages to receive and decode the RF signal to enable both strong and weak RF signals to be decoded.

The selection matrix 1100 is described herein in terms of two power metric thresholds (PMT1 and PMT2) and two link quality metric thresholds (LQT1 and LQT2). In other implementations, any number of thresholds may be used for either the power metric or the link quality metric. Similarly, although only three RF front-end configurations are described, in other implementations, any feasible number of front-end configurations may be used.

In the foregoing specification, the example embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method comprising:
    receiving a radio-frequency (RF) signal via a configurable front-end of a wireless device;
    determining a power metric for the wireless device, wherein the power metric indicates an amount of available power to the wireless device;
    determining a link quality metric based at least in part on a signal from a circuit to harvest power from the received RF signal;
    determining a configuration of the configurable front-end based at least in part on the power metric and the link quality metric; and
    configuring the configurable front-end based at least in part on the determined configuration.

2. The method of claim 1, wherein the signal from the circuit indicates the received RF signal has a signal strength is greater than or equal to −10 dBm.

3. The method of claim 1, wherein the power metric indicates an amount of power harvested from the received RF signal.

4. The method of claim 1, wherein the power metric is based at least in part on a battery capacity and a charge condition of a battery supplying power to the wireless device.

5. The method of claim 1, wherein determining the configuration comprises:
selecting a configuration of the configurable front-end from a selection matrix based at least in part on the power metric and the link quality metric.

6. The method of claim 5, wherein the selected configuration is from a group consisting of a high power configuration, a medium power configuration, and a low power configuration.

7. The method of claim 1, wherein configuring the configurable front-end comprises:
disabling a voltage controlled oscillator; and
operating a ring oscillator to provide a clock signal for the configurable front-end.

8. The method of claim 1, wherein configuring to configurable front-end comprises:
disabling a first receive chain;
enabling a second receive chain; and
receiving the RF signal via the second receive chain, wherein the second receive chain consumes less power than the first receive chain.

9. The method of claim 1, wherein configuring the configurable front-end comprises:
reducing a sampling rate of an analog-to-digital converter to sample the received RF signal.

10. The method of claim 1, wherein configuring the configurable front-end comprises:
disabling a first low noise amplifier;
enabling a second low noise amplifier; and
receiving the RF signal via the second low noise amplifier, wherein the second low noise amplifier has a higher noise figure than the first low noise amplifier.

11. A wireless device comprising:
a configurable front-end configured to receive an RF signal;
a controller; and
a memory configured to store instructions that, when executed by the controller, cause the wireless device to:
determine a power metric, wherein the power metric indicates an amount of available power to the wireless device;
determine a link quality metric based at least in part on a signal from a circuit to harvest power from the received RF signal;
determine a configuration of the configurable front-end based at least in part on the power metric and the link quality metric; and
configure the configurable front-end based at least in part on the determined configuration.

12. The wireless device of claim 11, wherein the signal from the circuit to harvest power is configured to indicate that the received RF signal has a signal strength greater than or equal to −10 dBm.

13. The wireless device of claim 11, wherein the power metric is configured to indicate an amount of power harvested from the received RF signal.

14. The wireless device of claim 11, wherein the power metric is based at least in part on a battery capacity and a charge condition of a battery supplying power to the wireless device.

15. The wireless device of claim 11, wherein execution of the instructions to configure the configurable front-end cause the wireless device to further:
select a configuration of the configurable front-end from a selection matrix based on the power metric and the link quality metric.

16. The wireless device of claim 15, wherein the selected configuration is from a group consisting of a high power configuration, a medium power configuration, and a low power configuration.

17. The wireless device of claim 11, wherein execution of the instructions to configure the configurable front-end cause the wireless device to further:
disable a voltage controlled oscillator; and
operate a ring oscillator to provide a clock signal for the configurable front-end.

18. The wireless device of claim 11, wherein execution of the instructions to configure the configurable front-end cause the wireless device to further:
disable a first receive chain; and
enable a second receive chain; and
receive the RF signal via the second receive chain, wherein the second receive chain consumes less power than the first receive chain.

19. The wireless device of claim 11, wherein execution of the instructions to configure the configurable front-end cause the wireless device to further:
reduce a sampling rate of an analog-to-digital converter configured to sample the received RF signal.

20. The wireless device of claim 11, wherein execution of the instructions to configure the configurable front-end cause the wireless device to further:
disable a first low noise amplifier;
enable a second low noise amplifier; and
receive the RF signal via the second low noise amplifier, wherein the second low noise amplifier has a higher noise figure than the first low noise amplifier.

21. A method comprising:
receiving a radio-frequency (RF) signal via a configurable front-end of a wireless device;
determining an operating metric based at least in part on a signal indicating an amount of power harvested from the received RF signal;
configuring the configurable front-end to increase power consumption in response to determining that the operating metric is less than a first threshold; and
configuring the configurable front-end to decrease power consumption in response to determining that the operating metric is greater than a second threshold.

22. The method of claim 21, wherein the signal is proportional to the amount of power harvested from the received RF signal.

23. The method of claim 21, wherein the operating metric is further based at least in part on at least one of signal quality characteristics, detected interference information, or system information.

24. The method of claim 23, wherein signal quality characteristics include at least one from the group consisting of received signal power information, received signal quality information, received signal timing information, signal drift information, and received packet error rate.

25. The method of claim 23, wherein the detected interference information includes at least one from the group consisting of signal strength information associated with signal blockers, transmission retry rate information, and inferred blocker power information.

26. The method of claim 23, wherein the system information includes at least one from the group consisting of a transmission distance, an amount of data to be transferred, latency information, and battery state information.

* * * * *